Sept. 1, 1970 R. JOURDAN 3,526,875

DATA CHECKING DEVICE

Filed Oct. 27, 1966 4 Sheets-Sheet 1

Sept. 1, 1970 R. JOURDAN 3,526,875

DATA CHECKING DEVICE

Filed Oct. 27, 1966 4 Sheets-Sheet 4

3,526,875
DATA CHECKING DEVICE
Robert Jourdan, Paris, France, assignor to International Standard Electric Corporation
Filed Oct. 27, 1966, Ser. No. 589,864
Claims priority, application France, Oct. 29, 1965, 36,640, Patent 1,463,936
Int. Cl. G06k *5/02;* G06f *11/10*
U.S. Cl. 340—146.1 5 Claims

ABSTRACT OF THE DISCLOSURE

A checking device associated with data transmitting stations for detecting and signalling the operator's errors and misoperations. The device comprises means for detecting and counting the characters of a message and calculation circuits to process the detected characters to thereby establish a corresponding checking character. A comparator checks whether the checking character that is included in the message and the corresponding calculated checking character are identical to each other or are different. If they are different, the message is cancelled and an alarm signal is given to the operator.

Figure 1:
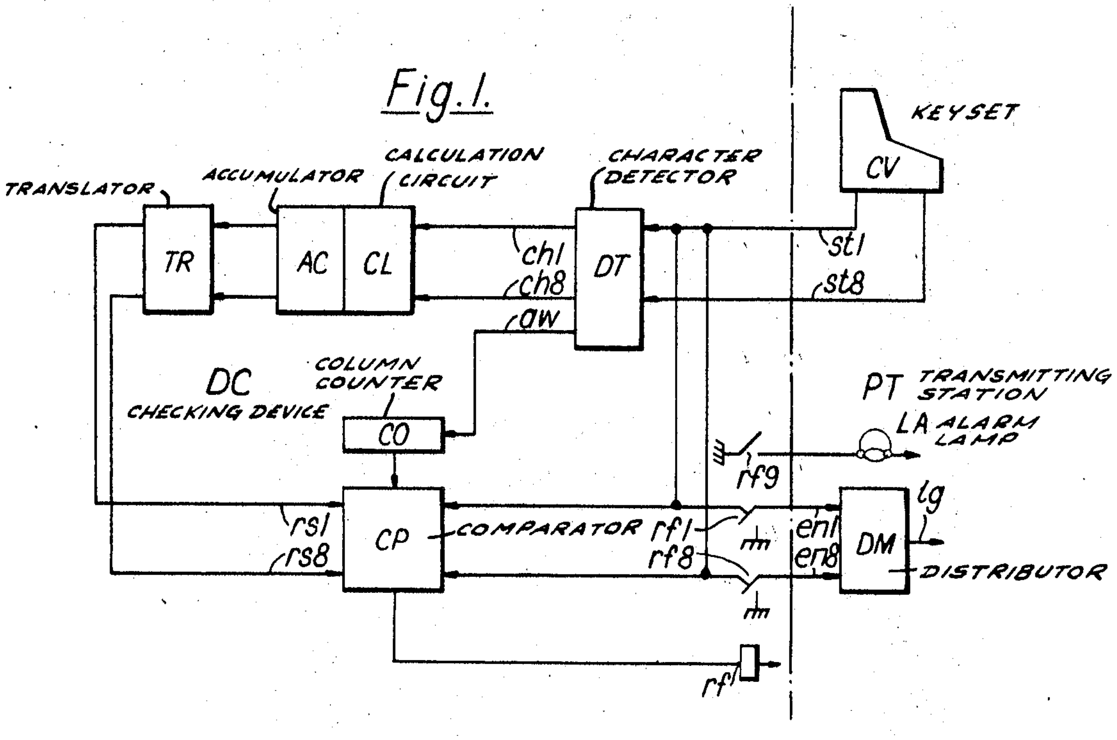

The present invention relates to a device for checking data transmitting, and more particularly to a device associated with a transmitting station handled by an operator and meant to perform the checking of the transmitted data, in order to detect and to signal the errors and misoperations made by the operator.

The data characters are alphabetical, numerical or other characters, being grouped to make up a message according to well determined rules. The message is made up before it is entrusted to the operator responsible for transmitting it. This latter will only have to manipulate the transmitting station, say for instance a telegraph transmitting apparatus such as a so-called teleprinter.

The telegraphic transmission is generally reliable. Whereas, at the source, there cannot be accorded as much trust to the transmitting operator. He might happen to transmit, without realizing it, one character for another, or to transpose two characters; and the frequency of these errors is such that it is better to keep him informed so that he might immediately correct them.

For this purpose, the constituting of the message entrusted to the operator responds to a definite law, and it is checked whether the transmitted message always obeys to this law. The present invention has for an object a checking device, simple and economical, responsible for performing automatically this checking operation.

More accurately speaking, with each message, or part of a message, a checking character gets associated, which is obtained from the message characters by applying certain rules of calculation. This checking character is incorporated into the message at a well determined spot, generally next to the characters to which it refers. The checking device calculates, according to the same rules, a new checking character from the transmitted characters, and compares it to the checking character of the message. If they are both different, the operator has made an error; he receives an alarm signal, and steps are taken to get the message cancelled. The operator is then to transmit once more the full message.

Purpose of the present invention is, therefore, a checking device associated with a transmitting station and performing the checking of transmitted messages according to the principle just mentioned above. The embodiment proposed here, account taken of the nature of the signals to be processed and of the transmitting speed, puts into application electromechanical switching arts rather than electronic arts; this makes possible to obtain a great flexibility of utilization and reliable operation at a moderate cost price. Nevertheless, it is evident that if other criteria, deemed more important would require rather the electronic solution, the present invention could be applied in an electronic or semi-electronic embodiment.

One of the features of the present invention is a checking device for data transmitting, associated with a data transmitting apparatus and comprising namely: means for detecting the characters of a message, one by one, just before they are transmitted, a column counter that steps forward by one step per each character transmitted, calculation circuits to process the detected characters in accordance with certain rules and establish a corresponding checking character, a comparator set into service at the adequate moment by taking as basis the position of the column counter which will check whether one checking character included in the message, and one calculated checking character, are both identical or are different; as well as means set into operation in case they are different, in order to replace the checking character of the message by a cancelling signal and to give to the operator of the transmitting apparatus an alarm signal indicating to him that the transmitted message is cancelled.

Another of the features of the present invention is that if all the characters of the message are not submitted to the checking operation, the checking device will comprise, in addition, a decoding circuit which receives each detected character and provides, namely for every character, a stepping signal that makes the column counter step forward by one step, and, for certain characters being alone submitted to the checking operation, a numerical indication transmitted to circuits of calculation of the checking character.

According to another of the features of the present invention, if the checking operation only bears upon a group of characters inside the message, the column counter will provide a signal, as soon as it receives the first character of the group, in order to set into function the calculation circuits which have remained up to now inactive.

According to another of the features of the invention, the column counter provides a second signal as soon as it receives the last character of the group, so as to set into service the comparator which checks whether the checking character of the message is or is not identical to the calculated checking character.

According to another embodiment, a further feature of the present invention is a checking counter, set into operation by the column counter as soon as the first character of a group is received, and which then steps forward step by step at the same time as the column counter; this checking counter will provide the signal which sets into function the comparator after having accomplished as many steps as there are characters in a group to be checked; then it will be restored to rest condition in order to be used again in the same fashion several times, if the message comprises several groups of characters to be checked.

According to another preferred embodiment, a further feature of the invention is that the column counter, while setting into function the checking counter at outset of a group of characters to be checked, will provide an indication which is immediately recorded and which indicates how many characters the group comprises, means being provided for combining this indication and the position of the checking counter and for originating the signal which sets into function the comparator when the checking counter has performed the indicated number of steps; then the checking counter is restored to rest condition and the indication removed, so that these units might be re-utilized in the same fashion several times, if the message comprises several groups of characters to be checked; the indication given by the column counter varying according to the number of characters of each group.

Another of the features of the present invention is that the checking device is provided for processing several types of messages, means being provided to receive and record an initial signal indicating to which type the next one or next several messages belong, and to perform consequently the necessary switching operations at the outputs of the column counter in order that each outlet, which corresponds to the beginning of a group of characters to be checked, might provide indication of the number of characters of this group.

Figure 2:
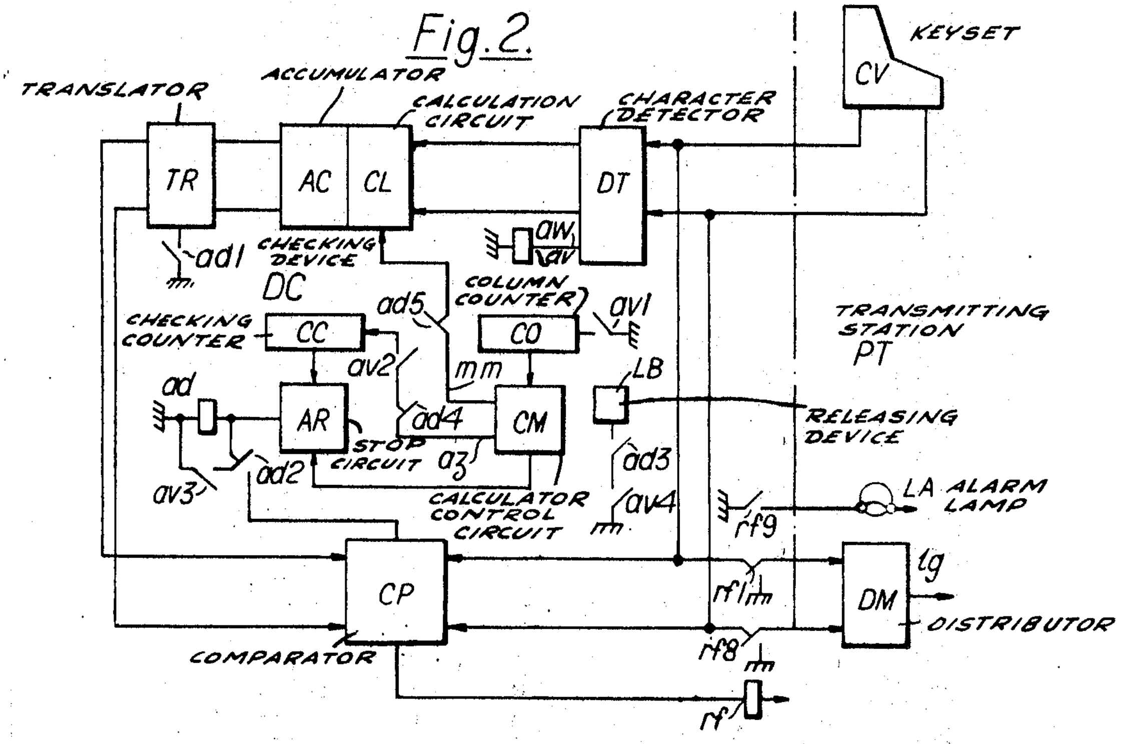
Figure 3:
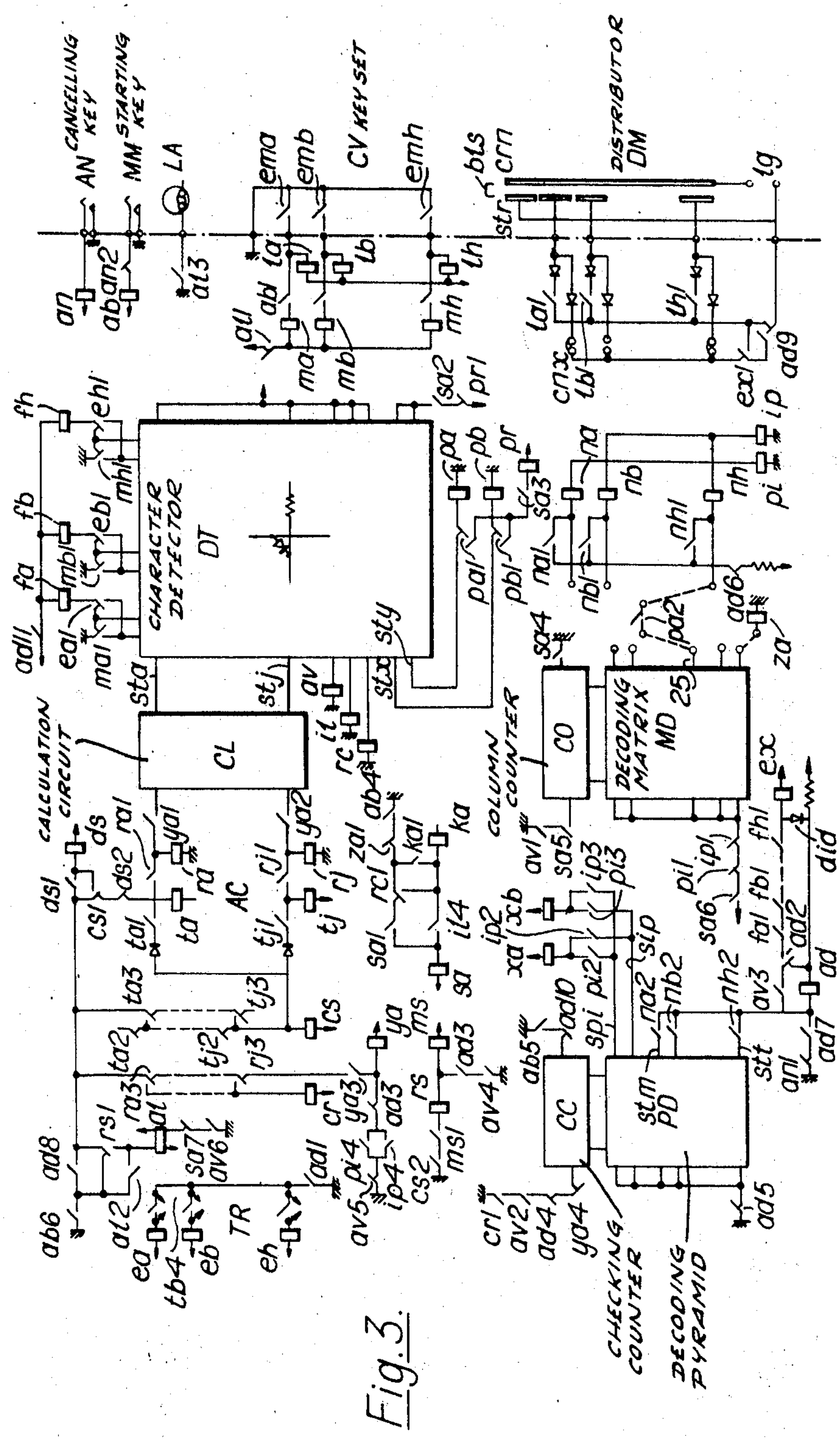
Figure 4:
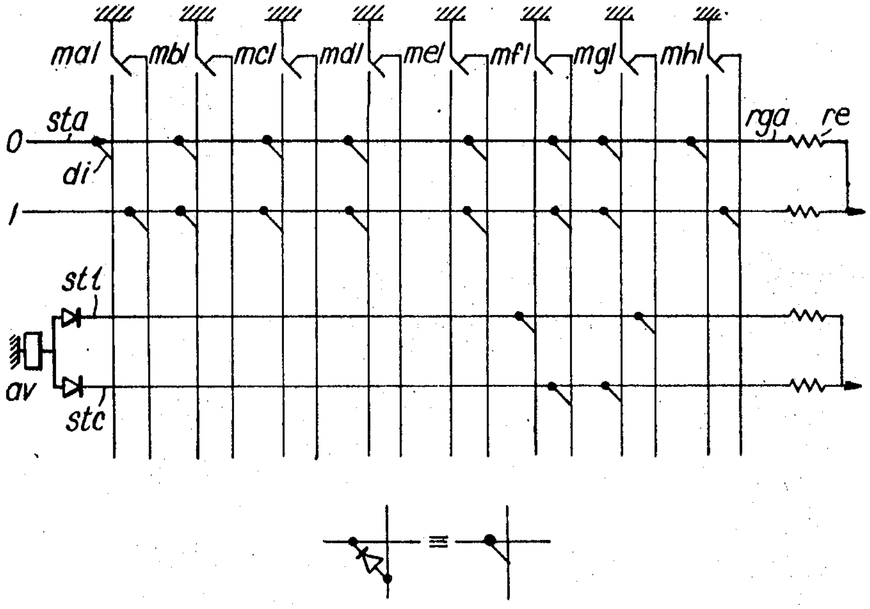
Figure 5:
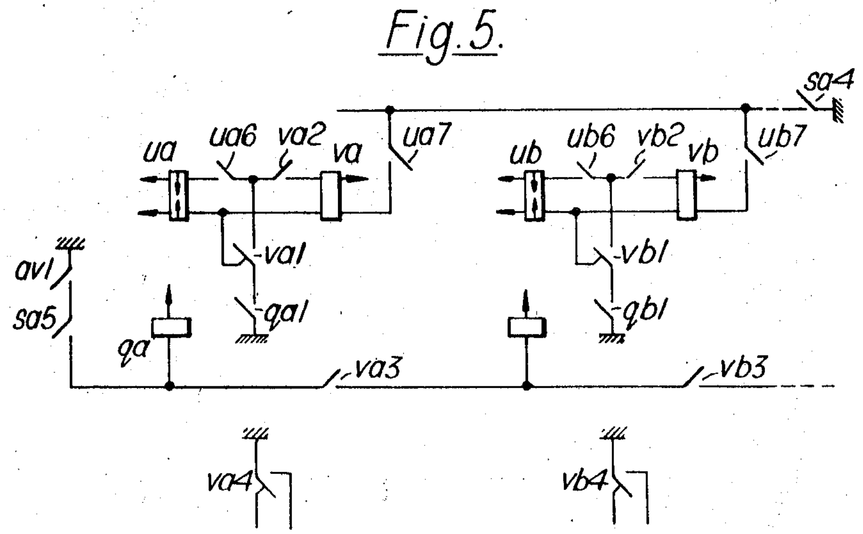
Figure 6:
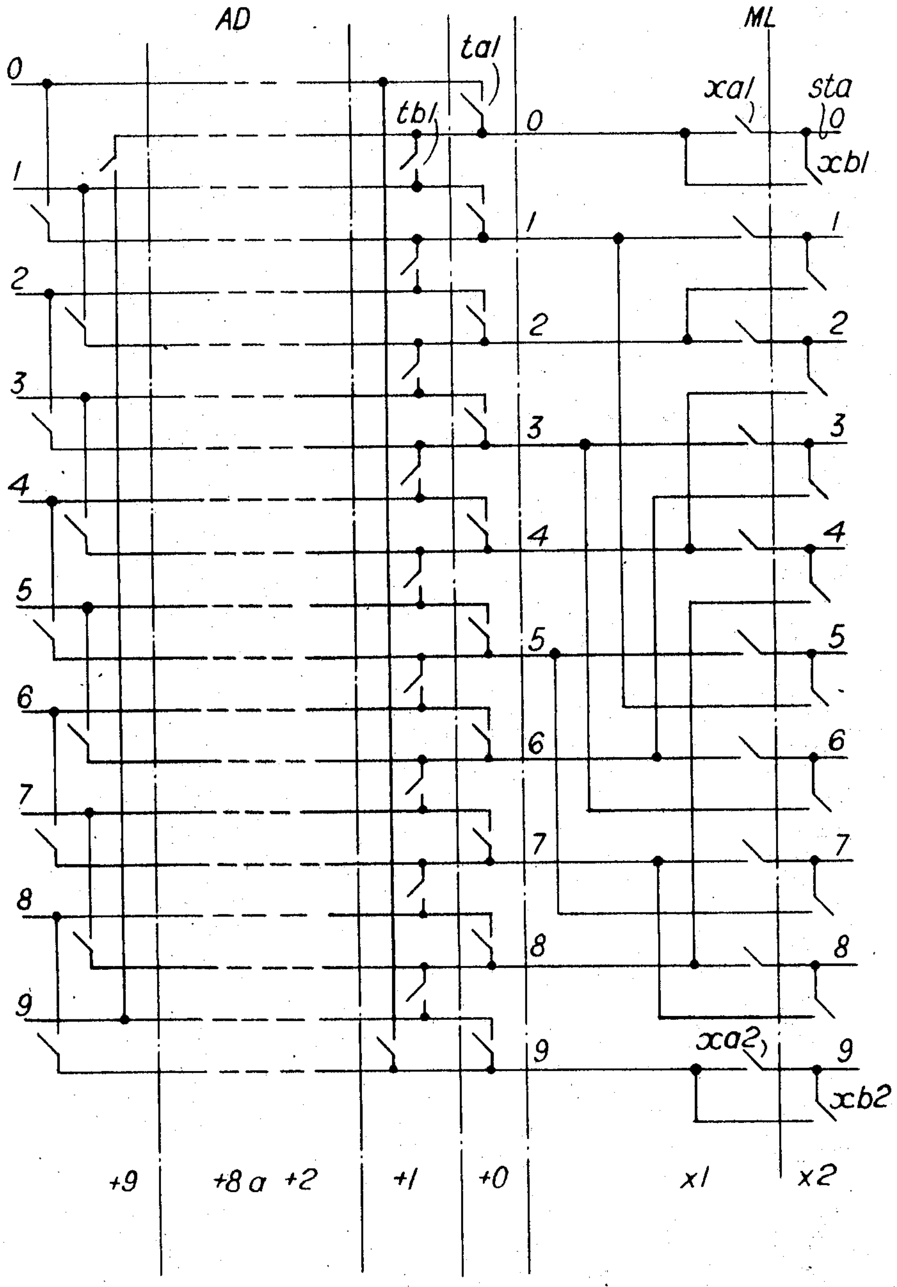

Different other features of the invention will become apparent from the description that follows, given by way of non-limiting example, in conjunction with the accompanying drawings, comprising:

FIG. 1, the block diagram of a first simplified embodiment of the present invention;

FIG. 2, the block diagram of a second embodiment of the present invention;

FIG. 3, a detailed diagram of an embodiment which corresponds to the diagram of FIG. 2;

FIG. 4, the block diagram of an embodiment of the character detector DT in FIG. 3;

FIG. 5, the block diagram of an embodiment of the counters in FIG. 3;

FIG. 6, the diagram of an embodiment of the calculation circuit CL in FIG. 3.

The block diagram of a first simplified embodiment of the invention is given by FIG. 1. There can be seen in it a transmitting station PT and the associated checking device DC. The transmitting station comprises the keyset CV and the distributor DM of a teleprinting apparatus, as well as an alarm lamp LA. Every time the operator depresses a key in the keyset, a coded combination originates through the keyset along eight wires *st*1 to *st*8, out of which only the first one and the last one are represented in the figure, in order to simplify this latter. At the same time, the distributor DM starts operating. In a normally wired apparatus, the wires *st*1 to *st*8 are directly connected to the wires *en*1 to *en*8 and the distributor receives the coded combination provided by the keyset. It therefore sends out along the line *lg* a telegraph charactered formed up of successive signals, or impulses which reproduce the code elements received from the keyset along the wires *en*1 to *en*8.

The invention provides the connecting of a checking device such as DC to the wires *st*1 to *st*8 and *en*1 to *en*8, in order to take notice of the keyboarded characters, to check the composition of the sent message, and to signal to the operator any error or misoperation. Inside this device, the wires *st*1 to *st*8 are connected to wires *en*1 to *en*8, through the contacts *rf*1 to *rf*8 of a relay *rf*. As long as the transmitted messages are correct, the relay *rf* remains at rest condition and its contacts remain in the position shown in the figure; the characters depressed on the keyset by the operator are transmitted along line *lg*.

In the checking device DC, the wires *st*1 to *st*8 are also connected to a character detector DT. This latter, which is a mere decoding circuit analysing the combinations originated from the keyset, will provide in exchange of each one of them an impulse along the wire *aw*, and a numerical indication along the wires *ch*1 to *ch*8.

Each one of the impulses transmitted along the wire *aw* steps a column counter CO forward by one step. This counter enables therefore to follow, character by character, the transmission of a message. It is provided to announce in advance the sending of the checking character by the operator.

The numerical indication originated along the wires *ch*1 to *ch*8 is transmitted to a calculation circuit CL which performs various operations as per the provided indications and according to a well determined rule so as to calculate a checking character from the message of characters. The result of the calculations, after the reception of each character of the message is stored in an accumulator AC and it is communicated to a translator TR. This latter provides in exchange, along wires *rs*1 to *rs*8, a coded combination which is the checking character of the part of message already transmitted.

The checking device DC is moreover completed by a comparator CP controlling the relay *rf*. A relay represented in the figures by a rectangle with, on either side, the connections of one or two windings, will control contacts which can be positioned anywhere in the diagram and which bear the reference symbol of the relay followed by a digit. Thus, the relay *rf* controls the contacts *rf*1 to *rf*8 and *rf*9. Finally, it is worth noting that the circuits of the device are current-supplied by a current source such as a battery, the positive terminal of which is earthed; the circuits connected to its negative terminal have at their end an arrow.

It will be assumed that a message is being transmitted, which is terminated by a checking character. Until transmission of the one before last character, the column counter CO will step forward step by step and the calculation circuit CL will accomplish its function. When transmission of this character is terminated, the position of the counter CO indicates that the next character is the checking character. Consequently, the counter CO sends out to the comparator CP a setting-into-function signal. At the same instant, the accumulator AC receives from the calculation circuit CL the result of the preceding calculations, also transmitted to the translator TR which provides in exchange a coded combination in the direction of the comparator CP. On the other hand, the wires *st*1 to *st*8 are also connected to the comparator CP. Thus, as soon as the last character is struck by the operator on his keyset, the corresponding coded combination is compared to the one that results from the checking calculations.

If the comparison gives a positive result, that is to say if the checking character struck by the operator is identical to the checking character calculated by the device DC, the comparator CP remains without any action. The depressed checking character is normally sent along the line *lg*. Means, not shown in the figure, release the checking device in view of the next message.

If the comparison gives a negative result, the message in the process of being transmitted is incorrect. The comparator CP provides a signal to energize the relay *rf*, the contacts of which change position. Instead of receiving the coded combination originating from the keyset, the distributor DM receives, by means of the make contacts *rf*1 to *rf*8, an earth potential along certain of the wires *en*1 to *en*8 which correspond to a character signalling that the message is incorrect and must be cancelled. At the same time, the contact *rf*9 closes the circuit of an alarm lamp LA which lights up in order to indicate to the operator that the transmitted message has been found incorrect and that it is cancelled. Means, not shown in the figure, block the operation of the device; the release being controlled by the operator.

Of course, the embodiment just describd above is only an example. It can be adapted to various cases of use. Namely: the coded combinations provided by the teleprinter may have a different number of elements; the column counter CO may be removed if the teleprinter comprises a tabulator able to be adjusted so as to send to the comparator CP a setting-into-function signal just before the transmission of a checking character; the relay and its contacts can be replaced by any other device filling the same function; the checking calculation may bear only on certain characters of the message, the digits for instance, for which the detector DT provides a numerical indication, the other characters being ignored, etc.

FIG. 2 gives the block diagram of a second embodiment of the present invention enabling, inside a same message, to check several groups of characters provided each with a checking character. The transmitting station PT is the same as the one of FIG. 1. The checking device DC derives from the one of FIG. 1, and the elements filling the same functions keep the same references.

In the device in FIG. 2, the pulses originated along the wire *aw* by the character detector DT energize a relay *av*, and are repeated by the contact *av*1 in order to step the column counter CO forward.

The counter CO will first count, possibly, the characters which do not have to undergo a checking operation. When the last one of these characters is transmitted, the counter CO reaches a position wherein it sends out to a calculation control circuit CM a signal indicating that the checking must start, and, indicating upon how many characters this checking bears. The calculation control circuit CM stores the indication and transfers it upon one of the inlets of a stop circuit AR. Moreover, it transmits a signal along the wire *mm* in order to start the calculation circiit CL, so far inactive and it provides a potential along the wire *az*, so as to make possible the operation of the checking counter CC.

The transmission of the message characters goes on. Starting from the next character, each impulse transmitted along wire *aw* by the character detector DT and energizing the relay *av*, steps the counter CO forward by one step through the contact *av*1, and steps also the counter CC forward by one step through the contact *av*2. The counter CC, thus, counts the characters to be checked. Simultaneously, the calculation circuit CL, now in service, accomplishes its function and elaborates the checking character of the group considered.

The stop circuit AR has as function to announce the incoming of the checking character of the group. The number of characters to be checked is stored by the control circuit CM which has received it from the counter CO. The number of characters already transmitted is indicated by the counter CC. When the two numbers are equal, the stop circuit AR responds by providing a signal which energizes the relay *ad*. More precisely speaking, the relay *ad* is only energized at opening of short-circuit contact *av*3, after reception of the one before last character of the group and just before the checking character gets received.

Opening of contacts *ad*4 and *ad*5 will suspend the operation of the calculation circuit CL and of the checking counter CC. The contact *ad*1 provides an earth potential making possible the operation of the translator TR, so far inactive. This arrangement is useful when the translator TR is realized by means of relays so as to have them operate only at the moment the checking character, established by CL, is required. Finally, the contact *ad*2 routs the earth potential provided by *av*3 in order to control the setting into service of the comparator CP.

Then, the checking character of the group is received. The relay *av* energizes, same as for the other characters, and it steps the column counter CO forward by one step, because the message is not terminated. Simultaneously, the comparator CP performs its function.

If the transmitted checking character and the checking character provided by the translator TR are identical, the relay *rf* remains at rest condition and the transmission takes place normally.

Furthermore, a releasing device LB receives an earth potential provided by the contacts *av*4 and *ad*3. This device is responsible, when sending of checking character is terminated, for cancelling the indication previously recorded in the calculation control circuit CM, thus restoring this unit to its rest condition; also for cancelling the contents of the accumulator AC and for restoring to rest condition the counter CC. Due to this, the relay *ad* releases also. All the circuits find themselves again in the condition that precedes the transmission of the group of characters to be checked. They are available for the checking of another group of characters, at the outset of which the column counter CO will provide to the calculation control circuit CM the indication of the number of characters to be checked.

If the transmitted checking character is different from the calculated checking character, as was described when reference was made to FIG. 1, the relay *rf* is energized in order to cause transmission of a cancelling signal and to give the alarm. Means not shown in the figure make possible in this case to block the operation of the entire device, the release being controlled by the operator.

Now will be described, in referring to FIG. 3, the detailed diagram of an embodiment of the present invention corresponding to the diagram in FIG. 2.

One finds again the transmitting station PT and the checking device DC. The transmitting station PT comprises: a cancelling key AN, a starting key MM, an alarm lamp LA, a keyset CV of which only the transmission contacts of the coded combinations are represented, a distributor DM of which only the banks (developed) and the brush *bls* are shown.

Every time the operator depresses a key, some of the omitting contacts *ema, emb . . . emh* will close for a lapse of time equal to the duration of transmission of a telegraph character. These contacts will energize, correspondingly, some of the relays *la, lb . . . lh,* in the checking device DC. The coded combination is repeated upon the contact-studs of the distributor DM by means of the contacts *la*1, *lb*1 . . . *lh*1. The brush *bls* which starts as soon as the key is depressed, will connect in succession the contact-studs, such as *str,* to the bank *crn.* The first one helps to send the "START"; it being the first pulse of the character during which the outgoing line *lg* is looped. Then, upon the next eight contact-studs, the line *lg* is or is not looped, according to combination provided by the keyset CV and repeated by the contacts *la*1 to *lh*1. The diodes only serve for the decoupling, and are connected in such manner as to be conductive. The transmission thus gets performed as if the contacts of the keyset were connected straight to the contact-studs of the distributor, that is to say as if the checking device did not exist.

When the operator has to transmit a message of data to be checked, the key MM is depressed first. The relay *ab* energizes. It controls the starting into operation of the checking device DC.

Contacts such as *ab*1 close and connect the relays *ma, mb . . . mh,* in parallel upon the relays *la* to *lh,* in order to read the transmitted combinations in respect of the checking circuits. These relays control the contacts *ma*1, *mb*1 . . . *mh*1 applying each transmitted combination upon the column wires of a diode decoding matrix making up the character detector DT. The row wires of this matrix are current-supplied, on the right, by the negative potential of the battery. They provide an outgoing signal, on the left, as per the combinations applied upon the column wires.

FIG. 4 shows an embodiment of this matrix, for decoding the digits 0 and 1, as well as for detecting the letters and digits. The code used is the "ACII" code. The negative potential applied along the row wire *rga,* through the resistor *re,* reaches the outlet *sta,* on condition that no earth be applied upon this wire through the diodes such as *di.* This will take place when the relays *me* and *mf* (not represented) are energized, as per the combination provided by the keyset CV (FIG. 3), and will close their make contacts; the other relays of *ma* to *mh* being in rest condition. The same arrangement applies for the decoding of digit 1 and of all the other digits letters or various characters, identification of which will be necessary. The corresponding symbol diagram is shown inside the rectangle DT in FIG. 3.

All the combinations translating the letters, in the code ASCII, give place to the energizing of relay *mg*; the relay *mf* remaining at rest condition. For the combinations translating the digits, the relay *mf* energizes; whereas the relay *mg* remains in rest condition. In the first case, the negative potential reaches relay *av* (FIGS. 3 and 4) by means of wire *stl,* through a decoupling diode. In the second case, it reaches relay *av,* by means of wire *stc.* Same applies to all the combinations giving place to the stepping forward of the teleprinter carriage, such as those which translate the punctuation signs the mathematical signs and others; these combinations belonging to the first or to the second foregoing case. FIG. 4, thus, shows how it is possible to detect the key depressing of any character that is to be taken into consideration in the checking device. It is quite evident, however, that one may use another telegraph-code and adapt the decoding matrix in respect of the characteristics of the combinations to be detected.

The character detector DT in FIG. 3, wired as shown in FIG. 4, has for function: to detect the ten digits from 0 to 9 by marking negatively one of the outlets *sta* to *stj,* to energize the relay *av* at each character which is to be taken into consideration, as well as to detect the "line feed" combination by energizing relay *il,* and, the "carriage return" by energizing relay *rc.* It can also detect other combinations. For instance, in FIG. 3, it detects two additional pre-determined combinations by marking the outlets *stx* or *sty.*

The operator before transmitting a message must depress the "carriage return" and the "line feed" keys. The corresponding combinations transmitted to the character detector DT causes the successive energizing of relays *rc,* then *il.* The relay *ka* is energized, at the same time as the relay *rc,* by means of contacts *ab*4 (starting into operation), *za*1 and *rc*1. It holds through *ka*1. Then, the relay *sa* is energized, at the same time as the relay *il,* through the contact *il*4. It holds through *sa*1. The energizing therefore of relay *sa* does, finally, characterize the correct reception of the "carriage return" and "line feed" characters. The contacts of this relay prepare the circuits for the checking of the message which will follow.

The operator transmits two classes of messages which require two different processes of checking. The first character of the message indicates which checking process is to be applied. This character is identified by the detector DT. For that purpose, the row wires *stx* and *sty* are current-supplied by the contact *sa*2 and, according to the character, the negative potential is provided upon wire *stx* or upon wire *sty*; say upon wire *sty* for instance. Relay *pa* energizes, its contact *pa*1 operates and it holds in series with the relay *pr* which energizes through the contact *sa*3. The relay *pa* indicates the checking program to be applied. The relay *pr* indicates that a program is recorded. Opening of contact *pr*1 cuts the current-supply of the decoding wires *stx* and *sty.*

The program character can be a special character, neither letter nor digit; and, in this case, the character detector DT does not cause energizing of relay *av.* The message then starts, and for each character taken into consideration the relay *av* energizes. It releases between these characters.

The characters of the message, detected by the energizing of relay *av,* are counted by means of the counter CO. This counter gets a holding earth potential through contact *sa*4, and, during the transmission of each character, a stepping signal through contacts *av*1 and *sa*5. It can be realized in different ways. FIG. 5 illustrates an embodiment, in the form of a binary stages relay counter, and of which the two first stages only are represented. The operating process of this counter will be described by referring simultaneously to FIGS. 3 and 5, wherein the same elements bear the same references.

Initially, all the relays of the counter in FIG. 5 are at rest condition. At the outset of the message, as was seen already, the relay *sa* (FIG. 3) energizes and the contacts *sa*4 and *sa*5 close. During transmission of the first character in the message, the contact *av*1 operates and the relay *qa* energizes. Contact *qa*1 closes and energizes the lower winding of relay *ua.* Contact *ua*7 closes, but the lower winding of the relay *va* is still short-circuited by the contacts *qa*1 and *va*1. When the relay *av* releases, the contact *av*1 opens. The relay *qa* releases and the short-circuit of the lower winding of relay *va* disappears. The relay *va* energizes therefore, whereas the relay *ua* holds, through contacts *ua*7 and *sa*4.

When the next character is detected, the contact *va*3 being closed, the contact *av*1 causes the simultaneous energizing of the relays *qa* and *qb.* The contact *qa*1 provides an earth which holds the relay *va,* by its upper winding, and the contacts *va*2, *va*1; and which causes the release of relay *ua,* by energizing its upper winding through contact *ua*6. This winding, as is indicated by the opposing arrows, has a reverse influence which cancels the influence of the lower winding. The relay *va* remains therefore all alone operating, until the relays *av* and *qa* release. It then releases and, after two characters, the first stage of the counter restores to its initial condition.

During this time, the contact *qb*1 causes the energizing of relay *ub.* When the relay *qb* releases, at the same time as the relay *qa,* the relay *ub* holds in series with the relay *vb*; the second stage of the counter operates exactly as the first one.

The third and fourth characters make the first stage of the counter accomplish a new operation cycle. The third character remains without any effect upon the second stage; whereas the fourth character, causing once more the energizing of relay *qb,* causes relay *ub* to release. After the fourth character, relay *vb* releases and the first two stages of the counter restore to their initial condition. The operation of the circuits in FIG. 5 repeats itself, as well as all the four characters.

During the fourth character, as the relays *va* and *vb* are being held and are ready to release, the relay *qc* of a third stage not represented in the figure is energized by the contacts *av*1, *sa*5, *va*3 and *vb*3. It will easily be seen that the counter is thus made up of successive stages accomplishing their cycle in 2, 4, 8, 16, etc. characters. The position of the counter indicated by the output contacts *va*4, *vb*4, etc.

In referring back now to FIG. 3, the output contacts of the counter CO control a decoding matrix MD, realized in the same fashion as the matrix DT; current supply of the row wires being on the left and the outlets being on the right. Each outlet is marked with a negative potential when the counter happens to be in a well determined position. In fact, matrix MD does not comprise as many rows, and outlets, as counter CO has positions. Only certain positions of the counter require to be identified, and the matrix MD is wired in consequence.

It will be assumed in all the following descriptions that, inside a message which conforms to the program characterized by the energizing of relay *pa,* the checking bears upon a series of 9 digits from the 26th to the 34th character of the message; the 34th character being a checking character. In order to respond to this, the contact *pa*2 is connected by means of movable connections shown in the figure by dashed lines, between the outlet 25 of the decoding matrix MD, marked when counter CO is in position 25 (during the reception of the 25th character of the message), and the winding of relay *nh.* If the checking operation was bearing only upon two digits—a significant digit and a checking digit—the contact would have been connected to the relay *na.* In the case of three digits, it would have been connected to the relay *nb,* and so on. For every size of the group of digits to be checked, it is only necessary to provide a relay such as *na, nb, nh.*

According to the embodiment considered here, the relay *nh* energizes in series with a relay *ip,* these two relays hold through *nh*1 and *ad*6. The relay *ip* indicates that the number of digits to be checked is an odd number (9). Likewise, it can be energized in series with the relay *nb* (3 digits). Whereas, when the number of digits is even, it is the relay *pi* that energizes, say for instance in series with the relay *na* (2 digits). Opening of the contact *ip*1 (or *pi*1) breaks the current supply of the decoding matrix.

To summarize therefore, the operator transmits a program character energizing relay *pa*, then, characters not checked. The counter CO steps forward by one step per character. When the operator depresses the 25th character, the counter reaches position 25, the negative battery, provided by the contacts *sa*6, *pi*1 and *ip*1, is transmitted upon the outlet 25 of the decoding matrix MD; and the relays *nh* and *ip* energize. The checking operation, properly speaking, will now start.

It was seen already how the matrix DT provides, for each combination that corresponds to a digit, a negative signal upon one of the outlets *sta* to *stj*. This numerical indication is transmitted directly to the calculation circuit CL. The calculation circuit provides in exchange a result number, in direction of the relays *ra* to *rj* which serve as buffer register. The register, which is storing this result until the processing of the next character, is made up of relays *ta* to *tj*. When a result enters upon the relays *ra* to *rj*, the preceding result is removed from upon relays *ta* to *tj*. Then, the new result will take the place of the preceding one. These two registers and their control circuits constitute the accumulator AC.

Initially, none of the relays *ta* to *tj* are energized. The accumulator AC is empty, and, therein, by convention in this case, the digit 0 must be written. This is obtained at the starting of operation by the closing of contact *ab*6, which provides an earth energizing the relay *ta* through the contacts *rs*1, *cs*1 and *ds*2. The contact *ta*3 operates and causes the energizing of relay *cs*, on condition that none other of the relays *ta* to *tj* be at the same time in operating condition. Indeed, each relay controls two contacts such as *ta*2 and *ta*3, *tj*2 and *tj*3, connected in a well known fashion inside a chain so-called "one and one only." The earth provided by this chain, in parallel upon the relay *cs*, enables to ensure holding of the relay *ta*, through a decoupling diode and its contact *ta*1.

Operation of the contact *cs*1 routs earth from the energizing circuit of relay *ta* onto the winding of the relay *ds*, which energizes; then it holds by means of *ds*1. Opening of contact *ds*2 confirms the breaking of the initial energizing circuit of relay *ta* which nevertheless remains held by *ta*1 and the chain "one and one only." The preparation stage is terminated, the accumulator contains the digit 0.

The checking calculation commences at the 26th character. During reception of the 25th character, it was seen that the relay *ip* energizes. Immediately transmission of this character ends, the relay *av* releases; the contact *av*5 closes and, through *ip*4 and *ad*5, it causes the energizing of relay *ya*. The relay *ya* holds through *ya*3, *rj*3 . . . *ra*3, *rs*1 and *ab*6. Contacts such as *ya*1 and *ya*2 connect the relays *ra* to *rj* at the outlet of the calculation circuit CL.

When the operator depresses the 26th character, the decoding matrix provides a numerical indication upon one of the outlets *sta* to *stj* in the direction of the calculation circuit CL. This indication is processed by the calculation circuit CL, in a fashion which will be described subsequently; and the result obtained is provided in the form of a negative signal, in the direction of one of the relays *ra* to *rj*; say for instance *rj*. The relay *rj* energizes through the contact *ya*2. Its contact *rj*3 operates, it breaks the holding circuit of relay *ya* which releases and establishes the circuit of relay *cr* which energizes.

By releasing, the relay *ya* disconnects the relays *ra* to *rj* from the outlet of the calculation circuit CL. However, the relay *rj* holds in series with the relay *tj* which energizes, through the contact *rj*1. Relay *ta* being still in operating condition, the chain "one and one only" which holds the relay *cs* and the relays *ta* to *tj* is cut (opening of *tj*2). The relays *ta* and *cs* release, whereas the relay *tj* remains operating; its circuit being maintained through the relay *rj*. The decoupling diode, provided in the holding circuit of relay *ta*, prevents that this latter relay might hold in parallel upon relay *tj* and in series with the relay *rj*. When the relay *ta* has released and its contact *ta*3 has restored to rest condition, the chain "one and one only" is conductive again through *tj*3. The relay *cs* energizes once more, and the relay *tj* receives a holding earth through its contact *tj*1. At this instant the relay *rj*, short-circuited, releases. The new result has taken the place of the old one upon the memory relays *ta* to *tj*.

On the other hand, at the instant the relay *ya* has released an earth is applied to the stepping forward circuit of the control counter CC, through *cr*1, *av*2, *ad*4 and *ya*4. This counter, identical to the counter CO, is initially in position 0; it passes onto position 1 and it holds in that position thanks to the earth provided by the contacts *ab*5 and *ad*10.

After relay *rj* has released, the circuit of relay *cr* is opened. This relay releases and cancels the earth controlling the stepping forward of the control counter CC.

When transmission of the 26th character is terminated, the relay *av* releases. Its contact *av*5 closes and makes possible the re-energizing of relay *ya*. Everything is then ready for processing of 27th character; the operating process just described repeating itself. The accumulator AC receives thus the successive calculation results, whereas the control counter CC steps by one step per processed character.

The counter CC is made-up the same way as counter CO by a succession of three-relay stages, a control relay such as *qa*, and two relays mounted in bistable such as *ua* and *va* (FIG. 5). These relays instead of controlling a decoding diode matrix, same as for the counter CO, control a contact decoding pyramid PD of well known type. This contact pyramid, according to position of the counter, transmits the earth provided by the contact *ad*5, to one of the outlets *stm* to *stt*. Moreover, two additional outlets, controlled for instance by a contact such as *va*4 (FIG. 5), provide an indication of the parity of the position of the counter. When this latter happens to be on positions 0, 2, 4, 6 . . . the earth potential is provided to the outlet *spi*. When it is upon positions 1, 3, 5 . . . the earth potential is provided to the outlet *sip*. In the first case the contacts *ip*2 and *ip*3 being closed, the relay *xb* energizes; whereas, in the second case, it is the relay *xa*.

These two relays control the calculation process, inside the circuit CL, in the fashion which will now be described by referring simultaneously to FIG. 3 and 6.

The diagram in FIG. 6 gives an embodiment of the calculation circuits responding to a special method of checking. According to this method, the digits to be checked are transmitted such as they are being read, that is to say, in reverse order of their value—the unity digits last. In the embodiment taken up here, the operator transmits eight significant digits, the eighth one being the unity digit; then, a checking digit. The significant digits must be multiplied by 1, 2, 1, 2 . . . beginning with the unity digit; and the digits of the obtained result must be added up. The eighth digit, transmitted first, must be multiplied by 2; the seventh, secondly transmitted, must be multiplied by 1; and so on up to the eighth one, multipled by 1; the ninth transmitted digit being the checking digit. Thus, when the checking bears upon a total of nine digits, the calculation must start with a multiplication by 2. If it would bear on ten digits, the calculation would have to start with a multiplication by 1. It is therefore necessary to know the parity of the number of digits to be checked and of the number of transmitted digits in order to know what is the multiplication operation to be effected. This information (FIG. 3) is obtained by the energizing of relay *ip* (checking operation upon an odd number of digits) connecting the relay *xb* to the parity wire *spi* and the relay *xa* to the wire *sip*. The relay *xb* controls the multiplication by two of the digits to be checked, and the relay *xa* the multiplication by 1. The counter CC provides initially the earth upon the wire *spi*, and it energizes the relay *xb*, through the contact *ip*3. After one step, it provides the earth upon wire *sip* and energizes the relay *xa*; then it reenergizes *xb*, and so on.

In FIG. 6, the incoming wires *sta* to *stj* are found on the right, originating from the character detector DT numbered from 0 to 9. For each of the digits transmitted by the operator, one of them is marked with a negative potential; the others being earthed. They are connected, through the multiplier ML, to ten outgoing wires also numbered from 0 to 9. This multiplier comprises two parts. The part "*x*1," made up of ten contacts of relay *xa* such as *xa*1 and *xa*2, will make possible to connect directly the corresponding inlets and outlets of the multiplier ML since 0×1=0, 1×1=1, etc. The part "*x*2," made up of ten contacts of the relay *xb* such as *xb*1 and *xb*2, will make possible to connect the inlets and outlets of the multiplier ML by following the undermentioned rule:

| | |
|---|---|
| 0×2=0 | 5×2=10, 1+0=1 |
| 1×2=2 | 6×2=12, 1+2=3 |
| 2×2=4 | 7×2=14, 1+4=5 |
| 3×2=6 | 8×2=16, 1+6=7 |
| 4×2=8 | 9×2=18, 1+8=9 |

It is worth noting that this above rule of multiplication, according to which the digits of the result are added up between them, makes possible to have one outlet and one only correspond to any inlet. Each contact of the relay *xb* therefore connects an inlet to an outlet, same as the contacts of relay *xa*; and the negative potential marking an inlet, say 6 for instance, appears on an outlet 6 or 3 according to the case.

The multiplier ML is followed by an adder AD enabling to make the sum of the result established by the multiplier and of result previously calculated and recorded through the energizing of one of the memory relays *ta* to *tj* (FIG. 3). This sum is provided, on the left, upon outlets numbered also from 0 to 9. The rule of addition does not follow the rule of multiplication. If the sum is a two digit number, one would limit oneself in keeping the unity digit and abandon the tens digit, so as to obtain the one digit result which is being seeked.

FIG. 6 represents the addition circuits "+0," "+1" and "+9," the circuits "+2" to "+8" being omitted but able to be gotten without any difficulty. If the digit stored in memory is 0, the relay *ta* (FIG. 3) would be operating. Its contacts, such as *ta*1, enable to connect directly the corresponding inlets and outlets of the adder AD, since 0+0=0, 1+0=1, etc. If the digit stored in memory is 1, the relay *tb* (FIG. 3) would be operating. Its contacts such as *tb*1 enable to connect each inlet to the outlet of next rank; the inlet 9 being connected to the 0, since 9+1=10, that is to say 0 by omitting the tens digit. If the digit stored in memory is 9, the relay *tj* (FIG. 3) is operating. Its contacts such as *tj*1 enable to connect each inlet to the outlet of preceding rank of the adder AD, since 1+9=10, that is 0; 2+9=11, that is 1, etc.

Finally, the negative potential provided upon one of the outlets of the detector DT (FIG. 3) is routed in the multiplier ML and adder AD of the device CL, such as described in FIG. 6, towards one of the relays *ra* to *rj* (FIG. 3) of the buffer register.

If one refers back to the foregoing description of the processing of the 26th character, the relay *ta* is energized at the starting into operation of the device; the counter CC being in position 0. The relay *xb* is energized, immediately after relay *ip*, during reception of the 25th character. The contacts would, therefore, be in position inside the multiplier ML and the adder AD of the device in FIG. 6, before reception of the 26th character. Processing of the 26*th* character is entirely prepared and requires no delay, the potential provided by the character detector DT being immediately transmitted to one of the relays *ra* to *rj* (FIG. 3).

As soon as one of the relays *ra* to *rj* energizes, the relay *ya* releases. It disconnects the relays *ra* to *rj* of the calculation circuit, and this causes the transfer of the result upon the relays *ta* to *tj*. At the same time, closing of contact *ya*4 establishes the stepping circuit of counter CC which changes position. The relay *xb* releases, whereas the relay *xa* energizes. From this instant on, before reception of the 27th character, the calculation circuit CL is ready for the next operation.

The various operations described for processing of the 26th character repeat themselves for all the next characters, whereas the counter CC steps forward step by step. When the result obtained after reception of the 33rd character reaches the relays *ra* to *rj*, the relay *ya* releases once again and the counter CC performs a step forward which brings it onto position 9. The decoding pyramid PD will then provide the earth upon outlet *stt* towards the relay *ad*, through the contact *nh*2. As long as the 33*rd* character is being received, this earth remains without any effect, because the relay *ad* is short-circuited by the contacts *av*3 and *ad*2. When the sending of this character terminates and that the contact *av*3 opens, the relay *ad* can energize.

Opening of contact *ad*5 prevents the energizing of relay *ya*, the checking calculation being terminated and the result recorded by the relays *ta* to *tj* having to be conserved without risking being modified by the reception of the checking character.

Opening of *ad*4 and *ad*10 isolates the counter CC which restores to position 0. Opening of *ad*5 cancels the earth from upon the decoding pyramid. However, relay *ad* does not release because it holds by means of its contact *ad*7.

Opening of *ad*6 breaks the holding circuit of the relays *ip* and *nh*, which release.

The contact *ad*1 provides an earth which enables to energize some of the relays *ea* to *eh* of the translator TR. Those relays are controlled by contacts of the memory relays *ta* to *tj* so as to create, for every digit resulting from the checking calculations, the corresponding telegraph character. As an example the contact *tb*4 has been represented, which energizes namely the relay *eb* in order to characterize one of the elements of the telegraph character corresponding to the digit 1, in the code ASCII. It is worth noting that the telegraph character is not forcibly the expression of the calculated digit and that an additional operation is possible, say for instance the originating of the telegraph combination corresponding to the complement to 10 of this digit.

The relays of translator TR control the contacts *ea*1, *eb*1 . . . *eh*1 individually combined with the contacts *ma*1, *mb*1 . . . *mh*1, in the circuits of the comparison relavs *fa*, *fb* . . . *fh*; these relays being on the other hand set into service by *ad*11. Before the 34th character gets received, the contacts *ma*1, *mb*1 . . . *mh*1 are at rest condition. If the relay *ea* remains at rest condition, the relay *fa* energizes, through contacts *ma*1 and *ea*1 in rest condition. Same applies to all the rest-condition elements of the charatcer provided by the translator TR. For the operating elements (relay *eb* energized, for instance) the comparison relays remain in rest condition.

As soon as the 34th character presents itself, some of the relays *ma*, *mb* . . . *mh* energize. If the relay *mb* energizes, the relay *fb* can immediately energize through the contacts *mb*1 and *eb*1 operating. Same applies to all the operating condition elements found at the same time in the checking character received, and, in the calculated checking character. It was seen that the concordance of the rest-condition elements would also make possible the energizing of relays *fa*, *fb* . . . *fh*. The total concordance of the two characters would result therefore into the energizing of all the comparison relays. The relay *ex* will then energize through the following circuit: battery—winding of relay *ex*—*fh*1—. . . —*fb*1—*fa*1—*ad*2—*av*3—*ad*7—*an*1—earth.

When relay *ad* is getting energized, just before the reception of the checking character, the contact *ad*9 gets into operating condition, switching the return conductor of the line *lg* onto the contact *ex*1. If the checking character depressed by the operator is identical to the checking character calculated by the checking device, the relay *ex* energizes; as has already been seen above. The contact *ex*1 passes onto operating condition and the normal omitting circuit is re-established. The checking character is sent by the distributor.

The embodiment in FIG. 3 differs from the embodiments given by FIGS. 1 and 2 wherein a refusal relay was employed in case of error, because of the fact that in the present instance an accepting relay is employed, energized in the absence of any error. The result obtained is the same, and it is much simpler with relay circuits to ascertain the originating of an event (the concordance of the characters) than the negative.

On the other hand, the contacts *fa*1, *fb*1 . . . *fh*1, at the same time as they establish the circuit of the relay *ex,* will short-circuit the relay *ad* through the diode *did.* Because of this, the relay *ad* after a certain lag due to discharge of self-inductance of its winding, will release.

Before relay *ad* releases, the relay *ms* is energized by the contacts *av*4 and *ad*3. When the relay *ad* releases, the contact *ad*3 opens, and the relay *ms* holds in series with the relay *rs* which energizes through the contacts *cs*2 and *ms*1.

In the holding circuit of the memory relays, the contact *ad*8 restores to rest condition; then, contact *rs*1 is set into operating condition. At this instant, the earth provided by contact *ab*6 is disconnected; the relay *cs,* the relay *ds* and the operating memory relay among *ta* . . . *tj,* release. The relay *al,* being the alarm relay, cannot energize.

Release of the relay *ad* causes moreover the release of the checking circuits, and the restoring to initial situation. Contact *ad*9 re-establishes the retransmitting circuit. The contact *ad*1 releases the relays *ea* to *eh* of the translator TR. Contact *ad*11 releases the comparison relays *fa* to *fh,* and the relay *ex* of comparator CP releases. The relay *cs* having released, opening contact *cs*2 breaks the circuit of relays *ms* and *rs* which also release.

Closing of contact *rs*1 re-establishes the holding earth of the accumulator AC and causes, as was already described above, the energizing in succession of the relays *ta, cs, ds,* for the recording of the digit 0.

The checking device happens then to be in the position it occupied before the reception of the 25th character, except as concerns the position of counter CO, and it is ready to perform the checking of group characters.

The 34th character depressed by the operator may not coincide with the checking character calculated by the device. In this case, one at least of the relays *fa, fb* . . . *fh* remains in rest condition; the relay *ex* remains in rest condition and the relay *ad* in operating condition.

Instead of retransmitting the checking character presented by the contacts *la*1, *lb*1 . . . *lh*1, because contact *ex*1 remains in rest condition, the distributor DM sends out a special combination signalling the error and requesting the cancellation, of which the various elements are determined by the presence or absence of movable connections such as *cnx.*

The relay *ms* is energized, same as before.

When the sending-of-character cycle terminates, the relay *av* releases. Opening of contact *av*4 enables holding of relay *ms* in series with the relay *rs* which energizes. The relay *ad* being still in operating condition, relay *al* is energized through contacts *ab*6, *ad*8 and *rs*1. Opening of contact *al*1 disconnects the receiving relays *ma, mb* . . . *mh,* blocking the checking device. Contact *al*3 provides an earth which lights the alarm LA of the transmitting station PT. The operator is notified that the transmitted message has just been cancelled and that the transmission is blocked. Indeed, contacts *ex*1 and *ad*9 remaining in position, the distributor DM cannot any longer send characters other than cancellation characters.

The only efficient operation is the depressing of the cancellation key AN causing relay *an* to energize. Opening of contact *an*2 breaks the circuit of relay *ab* which releases, and that causes release of all the circuits; namely, release of relay *al* and the ceasing of the alarm signal. Moreover, opening of contact *an*1 breaks the holding circuit of relay *ad* which also releases. The operator can then start again the transmission of the message.

After correct transmission of a full message, the checking device is also blocked if the operator would accidentally depress additional characters. When the first one of these additional characters is received, the counter CO performs a step forward and the decoding matrix MD provides the negative potential upon a corresponding outlet onto which is connected the relay *za.* This relay energizes and opens its contact *za*1, causing the release of relays *ka* and *sa.*

The relay *al* is then energized by *av*6 and *sa*7. It holds through *al*2, causes the transmission of a cancellation character and gives the alarm as was already described above. The operator must order the cancellation.

Normally, the operator, after the end of a message, starts the transmission of a next message by depressing the "carriage return" and "line feed keys. When he depresses the "carriage return" key, the relay *rc* energizes, contact *rc*1 operates and breaks the holding circuit of relay *sa.* However, the relay *av* is not energized by these special combinations, so that the relay *al* remains in rest condition. If nature of the code used would make it necessary it would, moreover, be possible to break the circuit of the relay *av* by means of a contact of relay *rc.*

Opening of contacts *sa*4 and *sa*5 release the counter CO. Opening of contact *sa*3 cancels the recorded program by breaking the circuit of relays *pa* and *pr.* The checking device DC is back, therefore, in the position it occupied at the beginning of the reception of the first message.

It is understood the foregoing description of specific embodiments of this invention is made by way of example only and is not to be considered as a limitation on its scope. All the numerical indications are given only to facilitate the description of the operating process and the checking program may be different; the checking device, object of the present invention, being provided to adapt itself easily to any requirements.

SUMMARY

The present invention concerns a checking device associated with a data transmission unit. This checking device comprises, namely: means for detecting the characters of a message, one by one, just before they are transmitted, a column counter stepping one step per character transmitted, calculation circuits to process the detected characters according to certain rules and to establish a corresponding checking character, a comparator which is set into service at the appropiate instant by taking as basis the position of the column counter and which checks whether one checking character, included in the message, and the calculated checking character are both identical, or different; as well as means set into operation if these two characters are different, so as to replace the checking character of the message by a cancelling signal and to give an alarm signal to the operator of the transmitting unit advising him that the transmitted message is cancelled.

While the principles of the invention have been described above in connection with specific apparatus and applications, it is to be understood that this description is made only by way of example and not as a limitation on the scope of the invention.

I claim:

1. A data checking device for assuring the correctness of character messages sent from a keyset to a transmitting line through a distributor, associated with a data transmitting station, said device comprising: detector means for recognizing and decoding the character messages originated on said keyset, column counter means operated responsive to the recognition of said characters for determining when a transmitted check character is being received, calculation circuit means operated responsive to the receipt of decoded character messages for forming a checking character according to definite rules, means for enabling said calculation circuit means to receive only those characters which are to be submitted to the checking operation and to thereby prevent said calculation circuit means from receiving those characters which are not to be submitted to the checking operation, comparator means for comparing the formed checking character and the transmitted checking character received from said keyset, and means responsive to said comparator means finding differences between said formed checking character and said transmitted checking character for transmitting a message signal.

2. The data checking device of claim 1 and means responsive to said comparator means finding differences between said formed checking character and said transmitted character for generating an alarm signal.

3. The data checking device of claim 2, wherein said means for enabling said calculation circuit means includes means associated with said column counter for generating a first signal responsive to the receipt of the first character of a group of characters to be checked, calculation control circuit means operated responsive to said first signal for enabling said calculation circuit means, and means associated with said column counter for generating a second signal responsive to the receipt of a last character of a group of characters to be evaluated, stop circuit means operated responsive to said second signal for enabling said comparator means to compare said formed checking character and said transmitted checking character.

4. The data checking device of claim 3 including checking counter means operated responsive to signals received from said column counter to step in unison with said column counter, said checking counter means operating to enable said comparator per group of characters when a message being checked comprises a plurality of groups.

5. The data checking device of claim 4 wherein said device includes means for processing several types of messages, means for recording an initial signal indicative of the type of message, and means for operating said device responsive to said indicating signal to form a proper checking character.

References Cited

UNITED STATES PATENTS

| | | | |
|---|---|---|---|
| 2,857,100 | 10/1958 | Franck et al. | 235—153 |
| 3,040,985 | 6/1962 | Glaser et al. | 235—153 |
| 3,384,902 | 5/1968 | Schröder et al. | 340—146.1 |

MALCOLM A. MORRISON, Primary Examiner

R. S. DILDINE, JR., Assistant Examiner

U.S. Cl. X.R.

340—146.2